(12) United States Patent
Veerasangappa Kadi et al.

(10) Patent No.: US 10,496,982 B2
(45) Date of Patent: Dec. 3, 2019

(54) SECURE CONTACTLESS CARD EMULATION

(71) Applicant: Accenture Global Solutions Limited, Dublin (IE)

(72) Inventors: Viresh Veerasangappa Kadi, Bangalore (IN); Manigandan Kumarappan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 354 days.

(21) Appl. No.: 15/423,153

(22) Filed: Feb. 2, 2017

(65) Prior Publication Data

US 2017/0221047 A1    Aug. 3, 2017

(30) Foreign Application Priority Data

Feb. 3, 2016  (IN) .............................. 201641003788

(51) Int. Cl.
*G06K 19/06*  (2006.01)
*G06Q 20/34*  (2012.01)
(Continued)

(52) U.S. Cl.
CPC ......... *G06Q 20/352* (2013.01); *G06F 21/606* (2013.01); *G06Q 20/20* (2013.01);
(Continued)

(58) Field of Classification Search
CPC .. G06F 21/606; G06Q 20/20; G06Q 20/3278; G06Q 20/352; G06Q 20/3552;
(Continued)

(56) References Cited

U.S. PATENT DOCUMENTS

2005/0210279 A1   9/2005  Lee et al.
2008/0029607 A1   2/2008  Mullen
(Continued)

FOREIGN PATENT DOCUMENTS

WO   WO 2015/061354   4/2015
WO   WO 2015/084755   6/2015

OTHER PUBLICATIONS

Roland M., "Debugging and Rapid Prototyping of NFC Secure Element Applications," In: Memmi G., et al., "Mobile Computing, Applications, and Services: 5th International Conference, MobiCase 2013, Paris, France, Nov. 7-8, 2013, Revised Selected Papers," Mar. 11, 2014, Springer, pp. 298, 302-305, XP055360103.

(Continued)

*Primary Examiner* — Thien M Le
(74) *Attorney, Agent, or Firm* — Harrity & Harrity, LLP

(57) ABSTRACT

A device may detect a trigger to perform a contactless transaction. The trigger may relate to the device being within a threshold proximity of a point of sale device. The device may provide a dynamic card identifier associated with the device based on detecting the trigger to perform the contactless transaction. The device may exchange data, with the point of sale device after providing the dynamic card identifier, to perform a mutual authentication to establish a secure session. The data may be encrypted based on a dynamic diversified key associated with the dynamic card identifier. The dynamic card identifier and the dynamic diversified key may be valid for a threshold period of time and may be invalid after the threshold period of time. The device may perform the contactless transaction via the secure session based on exchanging the data to perform the mutual authentication to establish the secure session.

20 Claims, 11 Drawing Sheets

(51) Int. Cl.
G06F 21/60 (2013.01)
G06Q 20/20 (2012.01)
G06Q 20/38 (2012.01)
H04L 29/06 (2006.01)
G06Q 20/32 (2012.01)
G06Q 20/36 (2012.01)
G06Q 20/40 (2012.01)

(52) U.S. Cl.
CPC ..... G06Q 20/3278 (2013.01); G06Q 20/3552 (2013.01); G06Q 20/3574 (2013.01); G06Q 20/3672 (2013.01); G06Q 20/3829 (2013.01); G06Q 20/40975 (2013.01); H04L 63/0869 (2013.01); *G06Q 2220/00* (2013.01)

(58) Field of Classification Search
CPC .......... G06Q 20/3574; G06Q 20/3672; G06Q 20/3829; G06Q 20/40975; G06Q 2220/00; H04L 63/0869
See application file for complete search history.

(56) References Cited

U.S. PATENT DOCUMENTS

| | | | |
|---|---|---|---|
| 2008/0035738 A1* | 2/2008 | Mullen | G06Q 20/04 235/492 |
| 2008/0115199 A1 | 5/2008 | Young et al. | |
| 2011/0153496 A1* | 6/2011 | Royyuru | G06Q 20/12 455/466 |
| 2012/0191612 A1* | 7/2012 | Spodak | G06K 19/06187 705/65 |
| 2013/0054474 A1 | 2/2013 | Yeager | |
| 2013/0134216 A1* | 5/2013 | Spodak | G06K 19/072 235/380 |
| 2013/0200999 A1* | 8/2013 | Spodak | G05B 1/01 340/5.65 |
| 2013/0262317 A1 | 10/2013 | Collinge et al. | |
| 2015/0120556 A1 | 4/2015 | Brickell et al. | |
| 2016/0335531 A1* | 11/2016 | Mullen | G06K 19/07345 |
| 2017/0221047 A1* | 8/2017 | Veerasangappa Kadi | G06F 21/606 |
| 2018/0005227 A1* | 1/2018 | Sandelov | H04W 76/10 |

OTHER PUBLICATIONS

Extended European Search Report for European Application No. 17154608.8, dated Apr. 13, 2017, 12 pages.
Coskun et al., "Near Field Communication (NFC): From Theory to Practice", Feb. 13, 2012, 251 pages.
Langer et al., "Anwendungen and Technik von Near Field Communication (NFC)", Sep. 16, 2010, 162 pages.
Rankl et al., "Smart Card Handbook, Fourth Edition", Jul. 19, 2010, 262 pages.
Wikipedia, "Oyster Card", https://en.wikipedia.org/w/index.php?title=Oyster_card&oldid=700669470, Jan. 19, 2016, 29 pages.
Edgar et al., "Advanced Payments Report 2014", http://www.paymentscardsandmobile.com/wp-content/uploads/2014/02/PCM_EDC_Advanced_Payments_Report_2014_MWC.pdf, Mar. 7, 2014, 32 pages.
Edgar et al., "Advanced Payments Report 2015", http://www.paymentscardsandmobile.com/downloads/Advanced_Payments_Report_2015.pdf, Mar. 29, 2015, 32 pages.
Menezes et al., "Handbook of Applied Cryptography", Oct. 16, 1996, 198 pages.
Roland, "Debugging and Rapid Prototype of NFC Secure Element Application", MobiCase 2013-NFC Workshop, Paris, France, Nov. 7, 2013, 19 pages.
Wikipedia, "Key Derivation Function", https://en.wikipedia.org/w/index.php?title=Key_derivation_function_&oldid=697759612, Jan. 1, 2016, 3 pages.
Hendry M., "Multi-application Smart Cards: Technology and Applications" Jul. 23, 2007, Cambridge University Press, XP055610148.

* cited by examiner

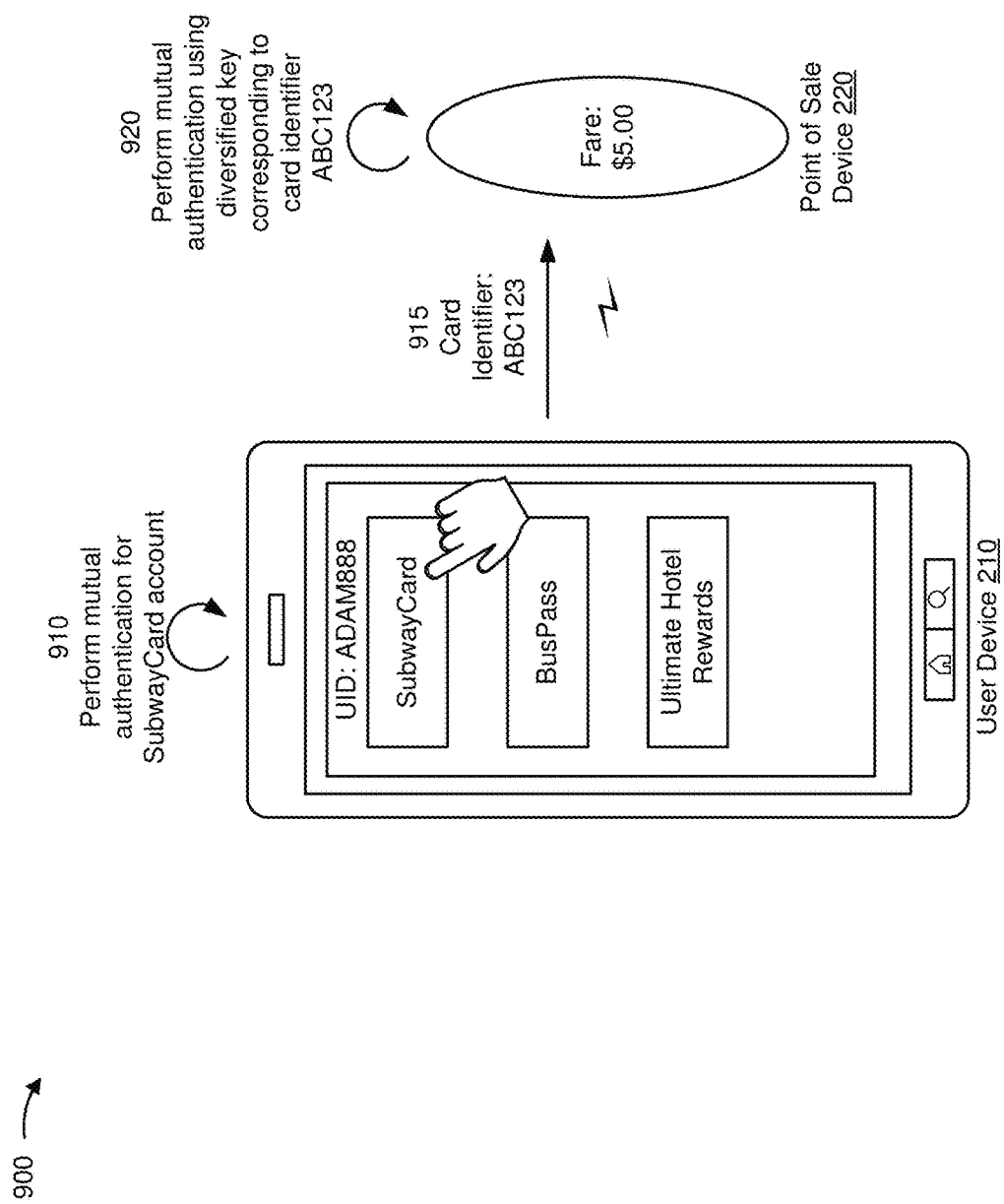

SECURE CONTACTLESS CARD EMULATION

RELATED APPLICATION

This application claims priority under 35 U.S.C. § 119 to Indian Patent Application No. 201641003788, filed on Feb. 3, 2016, the content of which is incorporated by reference herein in its entirety.

BACKGROUND

A contactless card (e.g., a payment card utilizing a near field communication based connection, a radio-frequency identification based connection, or the like) may be utilized to perform a contactless transaction. For example, a user may utilize the contactless card to pay for a subway fare, accrue rewards points, obtain a discount on a product purchase, purchase a product, or the like. The contactless card may be provisioned, for utilization, via a user device. For example, a user may utilize the user device to exchange authentication data with a set of servers to authenticate the contactless card for use. The user device may provide information to the set of servers associated with establishing an account for the user of the contactless card, associating the account with a static card identifier, or the like.

SUMMARY

According to some possible implementations, a device may include one or more processors. The one or more processors may detect a trigger to perform a contactless transaction. The trigger may relate to the device being within a threshold proximity of a point of sale device. The one or more processors may provide a dynamic card identifier associated with the device based on detecting the trigger to perform the contactless transaction. The one or more processors may exchange data, with the point of sale device after providing the dynamic card identifier, to perform a mutual authentication to establish a secure session. The data may be encrypted based on a dynamic diversified key associated with the dynamic card identifier. The dynamic card identifier and the dynamic diversified key may be valid for a threshold period of time and may be invalid after the threshold period of time. The one or more processors may perform the contactless transaction via the secure session based on exchanging the data to perform the mutual authentication to establish the secure session.

According to some possible implementations, a non-transitory computer-readable medium may store instructions that, when executed by the one or more processors, may cause the one or more processors to receive a first authorization token. The first authorization token may be associated with a first period. The one or more instructions, when executed by the one or more processors, may cause the one or more processors to perform a first mutual authentication using the first authorization token during the first period. The one or more instructions, when executed by the one or more processors, may cause the one or more processors to perform a first contactless transaction based on performing the first mutual authentication using the first authorization token during the first period. The one or more instructions, when executed by the one or more processors, may cause the one or more processors to receive, after the first period is complete, a second authorization token. The second authorization token may be associated with a second period. The one or more instructions, when executed by the one or more processors, may cause the one or more processors to perform a second mutual authentication using the second authorization token during the second period. The one or more instructions, when executed by the one or more processors, may cause the one or more processors to perform a second contactless transaction based on performing the second mutual authentication using the second authorization token during the second period.

According to some possible implementations, a method may include detecting, by a device, a trigger to perform a contactless transaction. The method may include transmitting, by the device, an identifier based on detecting the trigger to perform the contactless transaction. The method may include receiving, by the device, first encrypted data after transmitting the identifier. The method may include decrypting, by the device, the first encrypted data to generate first data based on a key associated with the identifier. The method may include encrypting, by the device, the first data and second data to generate second encrypted data based on the key. The method may include transmitting, by the device, the second encrypted data. The method may include receiving, by the device, third encrypted data. The method may include decrypting, by the device, the third encrypted data to identify the second data based on the key. The method may include transmitting, by the device, card data associated with an account based on decrypting the third encrypted data to identify the second data. The method may include receiving, by the device, updated card data associated with the account after transmitting the card data.

BRIEF DESCRIPTION OF THE DRAWINGS

FIGS. 9A-9C are diagrams of an example implementation relating to the example processes shown in FIGS. 5-8.

DETAILED DESCRIPTION

Figure 1:
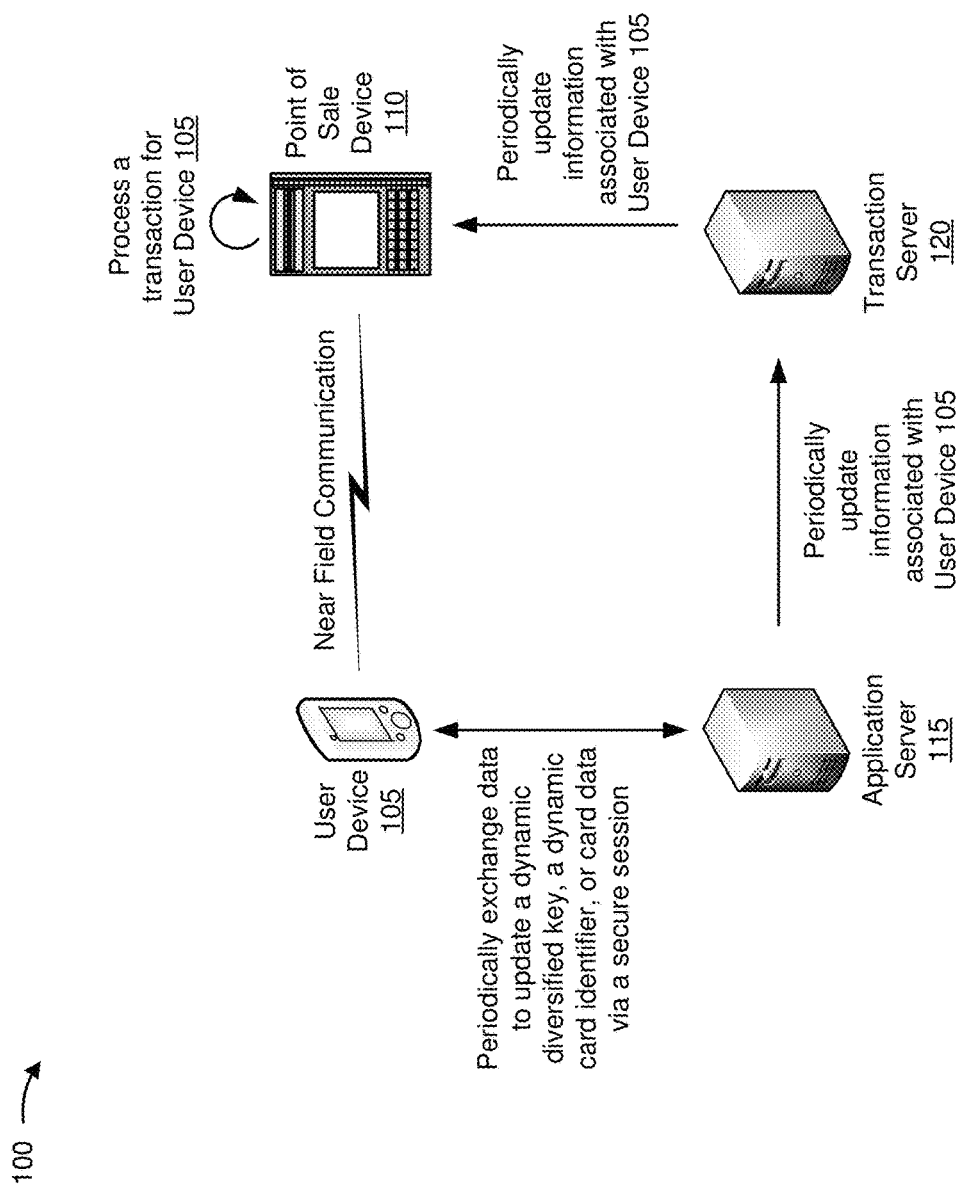
FIG. 1 is a diagram of an overview of an example implementation described herein.

The following detailed description of example implementations refers to the accompanying drawings. The same reference numbers in different drawings may identify the same or similar elements.

A contactless card may be provisioned to perform a contactless transaction with a point of sale device. For example, a user may be required to provision the contactless card via a user device (e.g., a computer) and a point of sale device (e.g., a validator device). The user device may transmit information to a fare management server, such as information identifying the contactless card (e.g., a unique identifier (UID)), information identifying a payment account, or the like. The fare management server may transmit information to a fare device subsystem, and the fare device subsystem may transmit information to the point of sale device.

The point of sale device may be provisioned with a first key (e.g., a master key), and may utilize an algorithm to generate a second key (e.g., a diversified key) based on receiving a UID from the contactless card. Similarly, the contactless card may include a stored key (e.g., a copy of the diversified key) for the UID. The point of sale device and the contactless card may perform a mutual authentication. Based on performing the mutual authentication the point of sale device may be permitted to read data from and write data to the contactless card to cause the contactless card to store a transaction record. For example, when the contactless card is a transit card, the point of sale device may read information identifying an amount of money available for paying a transit fare, subtract the transit fare from the amount of money to determine an updated amount of money, and write information identifying the updated amount of money to the contactless card.

When the contactless card is subsequently utilized for a contactless transaction, a point of sale device may read the updated amount of money from the contactless card. If the contactless card lacks sufficient funds for a payment, the user may be required to add value to the contactless card. For example, the user may be required to locate a point of sale device, perform a non-contactless transaction with the point of sale device (e.g., provide a credit card for payment), and perform a contactless transaction with the point of sale device (e.g., move the contactless card to within a particular proximity to cause the point of sale device to write data identifying a new amount of money for the contactless card).

However, provisioning the contactless card with a static key via both a user device and the point of sale device may be inconvenient, unsecure, and/or time-consuming. Moreover, the user is required to carry a contactless card for each type of point of sale device utilized. For example, the user may carry a contactless gift card for utilization at a first store, a contactless rewards card for utilization at a second store, a contactless transit card for utilization at a subway station, or the like. Furthermore, the user may be required to locate a point of sale device whenever the user desires to add value to the contactless card.

Implementations, described herein, may utilize dynamic key emulation to permit contactless transactions via a user device, thereby obviating the need for a user to carry a contactless card. Moreover, based on network connectivity of the user device, the user device may periodically update a key, a user identifier, an account value, or the like thereby improving security and convenience relative to a contactless card that is permanently validated for utilization and lacks network connectivity. Furthermore, based on the dynamic key emulation providing improved security, a user device that lacks dedicated Secure Element hardware may be utilized for key emulation without an increased risk of account fraud.

FIG. 1 is a diagram of an overview of an example implementation 100 described herein. As shown in FIG. 1, example implementation 100 may include a user device 105, a point of sale device 110, an application server 115, and a transaction server 120. User device 105 may connect to point of sale device 110 via a near field communication based connection and may connect to application server 115 via another type of connection.

As further shown in FIG. 1, user device 105 may connect to application server 115 and request data to permit user device 105 to perform a contactless transaction. For example, when user device 105 is registering with application server 115, user device 105 may provide financial information to application server 115, such as credit card information, bank account information, or the like, to permit application server 115 to credit and/or debit an account for user device 105. In this case, user device 105 may cause application server 115 to generate and provide a dynamic card identifier, a dynamic diversified key, and card data. The dynamic card identifier and the dynamic diversified key may be associated with a threshold period of time after which the dynamic card identifier and/or the dynamic diversified key may be updated. The card data may refer to data that is readable and/or writable by point of sale device 110, such as an indication of value (e.g., an amount of money in a transit account, an amount of rewards points in a rewards points account, etc.), a record of one or more transactions, or the like.

Based on application server 115 generating and providing the dynamic card identifier and the dynamic diversified key, application server 115 may be caused to provide, to transaction server 120, information indicating that the dynamic card identifier is valid, and transaction server 120 may be caused to provide, to point of sale device 110 information indicating that the dynamic card identifier is valid. In some implementations, application server 115 may periodically provide the information to transaction server 120 and transaction server 120 may periodically provide the information to point of sale device 110. Additionally, or alternatively, when point of sale device 110 detects user device 105, point of sale device 110 may request the information from transaction server 120.

Before the threshold period of time expires, user device 105 may exchange, via the near field communication based connection, encrypted data with point of sale device 110 to cause point of sale device 110 to process a contactless transaction for user device 105. For example, user device 105 may perform a mutual authentication procedure, based on the dynamic diversified key and the dynamic card identifier (e.g., a first copy stored via user device 105 and a second copy stored via point of sale device 110), to establish a secure session with point of sale device 110. In this case, user device 105 may cause point of sale device 110 to read the card data from user device 105 and selectively write updated card data to user device 105 to cause the contactless transaction to be performed. For example, when user device 105 is utilized to pay a $5 transit fare via point of sale device 110, point of sale device 110 may read card data indicating that user device 105 is associated with $20 in value in a transit fare account, and may write updated card data to user device 105 to cause the updated card data to indicate that user device 105 is associated with $15 in value in the transit fare account. In this way, user device 105 performs a contactless transaction with point of sale device 110.

User device 105 may provide the updated card data to application server 115 to indicate that the contactless transaction is performed. For example, user device 105 may provide information indicating that the transit account has $15 in value remaining. User device 105 may connect to application server 115, via a secure session, to cause application server 115 to transact with transaction server 120 to add value to an account associated with user device 105. In this case, application server 115 may be caused to utilize account information provided by user device 105 to transact with transaction server 120, and may provide updated card data to user device 105 to permit user device 105 to transact with point of sale device 110. For example, application server 115 may cause transaction server 120 to add $20 in value to the $15 in remaining value of the transit account. In this case, application server 115 may provide updated card data to user device 105 to cause user device 105 to indicate to point of sale device 110 that the transit account includes $35 in value. In this way, user device 105 is permitted to add value to an account without connecting to a point of sale device 110, thereby improving user experience and reducing resource usage of point of sale devices 110 by, for example, reducing demand for utilization of point of sale devices 110 relative to point of sale devices 110 being required for both contactless transactions and for account management.

After the threshold period of time expires, application server 115 may generate and provide an updated dynamic card identifier and/or an updated dynamic diversified key. User device 105 may utilize the updated dynamic card identifier and/or the updated dynamic diversified key to perform one or more other contactless transactions. Application server 115 may provide updated information to transaction server 120, and transaction server 120 may provide the updated information to point of sale device 110 to permit point of sale device 110 to perform mutual authentication and to read/write card data for user device 105.

As indicated above, FIG. 1 is provided merely as an example. Other examples are possible and may differ from what was described with regard to FIG. 1.

In this way, user device 105 permits contactless payments without requiring a user to perform a manual validation to utilize an account for a transaction and without requiring a point of sale device 110 be available to add value to an account. Moreover, user device 105 utilizes a mutual authentication procedure to establish a secure session with which to transmit card data and utilizes a dynamic card identifier and a dynamic diversified key, thereby reducing a risk of account fraud relative to a static card identifier and a static diversified key. Based on reducing the risk of account fraud, user device 105 may operate without Secure Element hardware, thereby reducing a cost of manufacturing user device 105, reducing a power consumption of user device 105, reducing a utilization of processing resources by user device 105, and the like.

Figure 2:
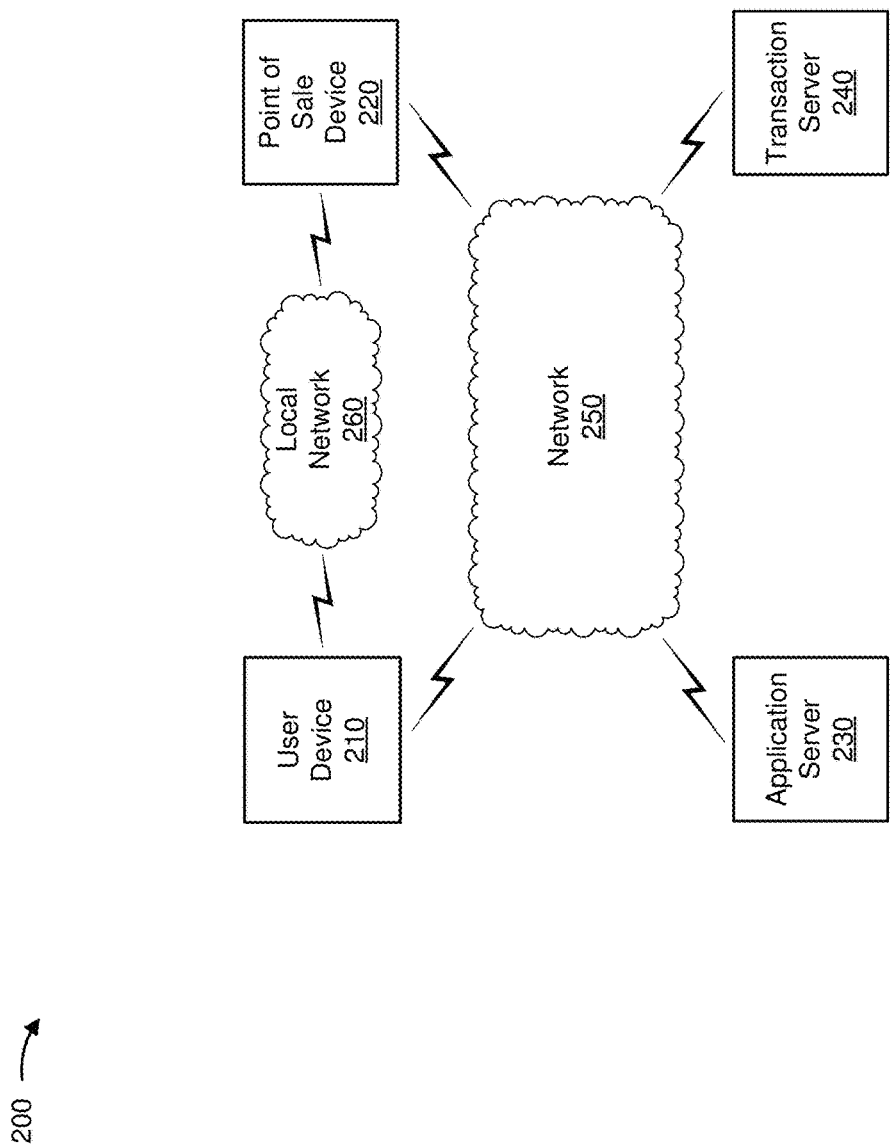
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a point of sale device 220, an application server 230, a transaction server 240, a network 250, and a local network 260. Devices of environment 200 may interconnect via wired connections, wireless connections, or a combination of wired and wireless connections.

User device 210 may include one or more devices capable of receiving, generating, storing, processing, and/or providing information associated with a contactless transaction. For example, user device 210 may include a communication and/or computing device, such as a mobile phone (e.g., a smart phone or a radiotelephone), a laptop computer, a tablet computer, a handheld computer, a gaming device, a wearable communication device (e.g., a smart wristwatch or a pair of smart eyeglasses), or a similar type of device. In some implementations, user device 210 may lack Secure Element hardware for storing a key. In some implementations, user device 210 may correspond to user device 105 shown in FIG. 1. In some implementations, user device 210 may receive information from and/or transmit information to another device in environment 200.

Point of sale device 220 may include one or more devices capable of receiving, generating, storing, processing, and/or providing information associated with a contactless transaction. For example, point of sale device 220 may include a computer (e.g., a desktop computer, a laptop computer, or a tablet computer), a smartphone, an electronic cash register, a point-of-sale terminal, a validator device, or the like. In some implementations, point of sale device 220 may correspond to point of sale device 110 shown in FIG. 1. In some implementations, point of sale device 220 may include a communication interface that allows point of sale device 220 to receive information from and/or transmit information to another device in environment 200

Application server 230 may include one or more devices capable of receiving, generating, storing, processing, and/or providing information associated with a contactless transaction. For example, application server 230 may include a server device that generates a dynamic diversified key, a dynamic card identifier, or the like for utilization by user device 210 in performing a contactless transaction. In some implementations, application server 230 may perform a mutual authentication with user device 210, such as for transmitting an updated dynamic card identifier, transmitting an updated dynamic diversified key, transmitting card data, or the like. In some implementations, application server 230 may correspond to application server 115 shown in FIG. 1. In some implementations, application server 230 may receive information from and/or transmit information to another device in environment 200.

Transaction server 240 may include one or more devices capable of receiving, generating, storing, processing, and/or providing information associated with a contactless transaction. For example, transaction server 240 may include a server device associated with managing transactions (e.g., a fare management server for a transit account or a loyalty management server for a rewards points account), a server device associated with managing a group of point of sale devices 220, or the like. In some implementations, transaction server 240 may correspond to transaction server 120 shown in FIG. 1. In some implementations, transaction server 240 may receive information from and/or transmit information to another device in environment 200.

Network 250 may include one or more wired and/or wireless networks. For example, network 250 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Local network 260 may include one or more wireless networks. For example, local network 260 may include a local area network, a personal areal network, or the like, such as a near field communication based network, a radio frequency identifier (RFID) based network, a Bluetooth based network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
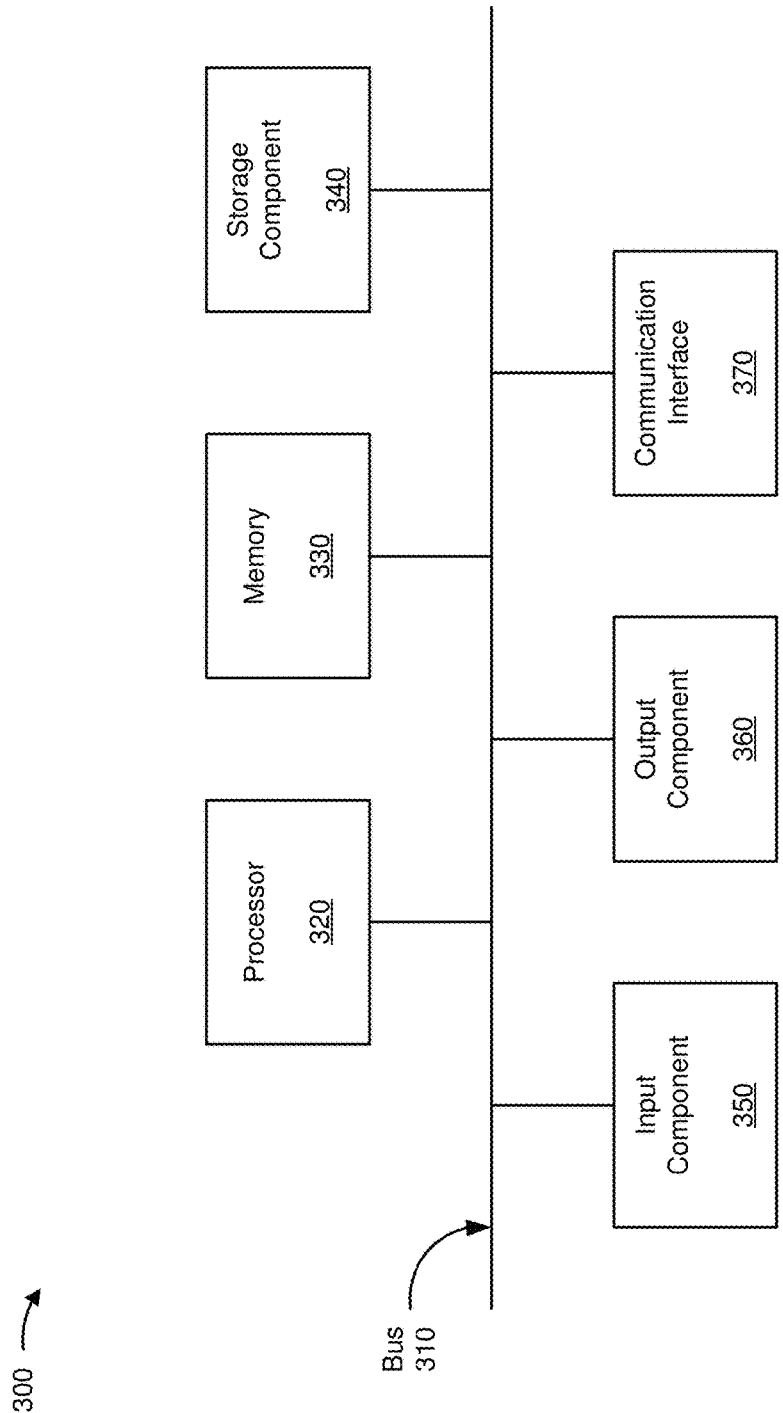
FIG. 3 is a diagram of example components of one or more devices of FIG. 2.

FIG. 3 is a diagram of example components of a device 300. Device 300 may correspond to user device 210, point of sale device 220, application server 230, and/or transaction server 240. In some implementations, user device 210, point of sale device 220, application server 230, and/or transaction server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA) or an application-specific integrated circuit (ASIC)) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, or an optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, or a solid state disk), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 may include a component that provides output information from device 300 (e.g., a display, a speaker, or one or more light-emitting diodes (LEDs)).

Communication interface 370 may include a transceiver-like component (e.g., a transceiver, or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
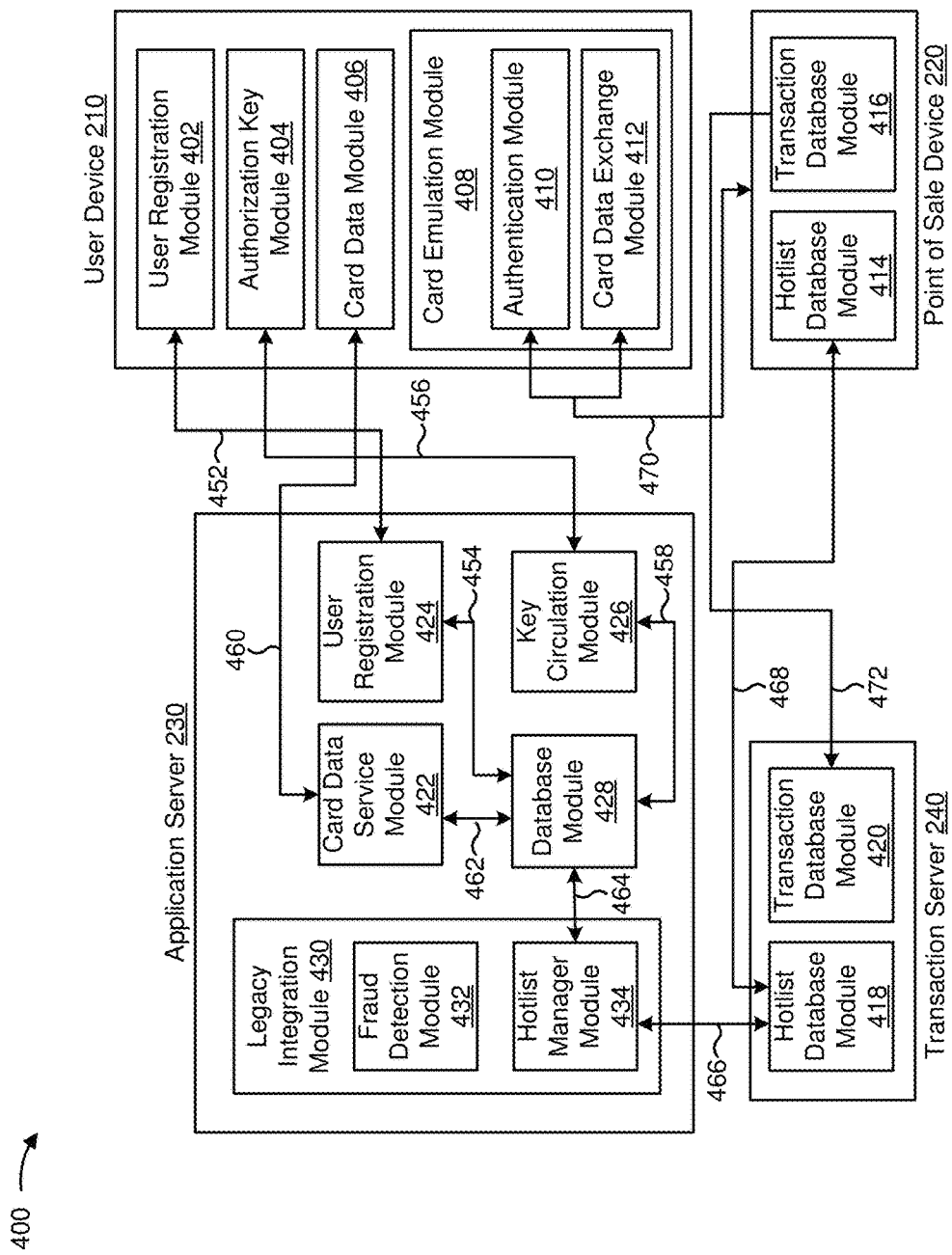
FIG. 4 is a conceptual diagram of one or more devices of FIG. 2.

FIG. 4 is a diagram of an example implementation 400. FIG. 4 shows a conceptual diagram of user device 210, point of sale device 220, application server 230, and transaction server 240. User device 210 may include user registration module 402, authorization key module 404, card data module 406, and card emulation module 408, which may include authentication module 410 and card data exchange module 412. Point of sale device 220 may include hotlist database module 414 and transaction database module 416. Transaction server 240 may include hotlist database module 418 and transaction database module 420. Application server 230 may include card data service module 422, user registration module 424, key circulation module 426, database module 428, and legacy integration module 430, which may include fraud detection module 432 and hotlist manager module 434.

As further shown in FIG. 4, and by reference numbers 452 and 454, user device 210 may exchange data with application server 230 to obtain and register a payment application to perform contactless transactions. For example, user device 210 may utilize user registration module 402 to exchange data with user registration module 424 to register a user of user device 210 with application server 230. In this case, user device 210 may provide information identifying the user, such as a user name, a user password, or the like. Additionally, or alternatively, user device 210 may provide financial information, such as credit card information, bank account information, or the like for the user, which may be stored by application server 230 via database module 428. User device 210 may receive a user identifier for subsequent utilization in identifying the user.

As further shown in FIG. 4, and by reference numbers 456 and 458, user device 210 may exchange data with application server 230 to obtain a dynamic card identifier and/or a dynamic diversified key to perform contactless transactions. For example, user device 210 may utilize authorization key module 404 to request that a dynamic card identifier and a corresponding dynamic diversified key be generated and provided by key circulation module 426. In this case, application server 230 may provide the dynamic card identifier and the dynamic diversified key, and may activate a timer to determine when to update the dynamic card identifier and the dynamic diversified key. The dynamic card identifier and the dynamic diversified key may be stored via database module 428.

As further shown in FIG. 4, and by reference numbers 460 and 462, user device 210 may exchange data with application server 230 to obtain card data relating to a particular account for performing contactless transactions. For example, user device 210 may utilize card data module 406 to request that card data be provided by card data service module 422 for the particular account (e.g., a transit account or a rewards points account). In this case, application server 230 may establish the account for user device 210, determine an amount of value associated with the account for user device 210, or the like. Application server 230 may provide card data, for storage via user device 210, indicating the amount of value associated with the account, and may store corresponding card data via database module 428.

As further shown in FIG. 4, and by reference numbers 464-468, application server 230 is caused, by user device 210, to exchange data with transaction server 240, and transaction server 240 is caused to exchange data with point of sale device 220 to permit point of sale device 220 to perform a contactless transaction with user device 210. For example, legacy integration module 430 permits integration with transaction server 240 by utilizing hotlist manager module 434 to provide information to hotlist database module 418. In this case, application server 230 provides information identifying the dynamic card identifier stored via database module 428, via a legacy connection to transaction server 240 (e.g., a connection intended for utilization in providing a static card identifier). Hotlist database module 418 provides the information identifying the dynamic card identifier to point of sale device 220 to permit point of sale device 220 to generate a dynamic diversified key corresponding to the dynamic card identifier for utilization in a contactless transaction. Periodically, hotlist manager module 434 (e.g., based on a time based trigger or based on fraud detection module 432 detecting fraudulent activity) may cause hotlist database module 418 to remove the dynamic card identifier and store an updated dynamic card identifier.

As further shown in FIG. 4, and by reference number 470, user device 210 may exchange data with point of sale device 220 to perform a contactless transaction. For example, card emulation module 408 of user device 210 may utilize authentication module 410 to perform a mutual authentication procedure with point of sale device 220 based on the dynamic card identifier and the dynamic diversified key. In this case, based on performing the mutual authentication procedure, card emulation module 408 may utilize card data exchange module 412 to exchange card data with point of sale device 220. Point of sale device 220 may selectively update the card data, and may cause the selectively updated card data to be stored via user device 210.

As further shown in FIG. 4, and by reference number 472, point of sale device 220 may be caused to exchange data with transaction server 240. For example, point of sale device 220 may utilize transaction database module 416 to provide information associated with the contactless transaction for storage via transaction database module 420, such as information identifying user device 210, information identifying a record of the contactless transaction, information identifying an alteration to an account value, or the like. Similarly, user device 210 may provide information associated with the transaction to application server 230.

As indicated above, FIG. 4 is provided merely as an example. Other examples are possible and may differ from what was described with regard to FIG. 4.

Figure 5:
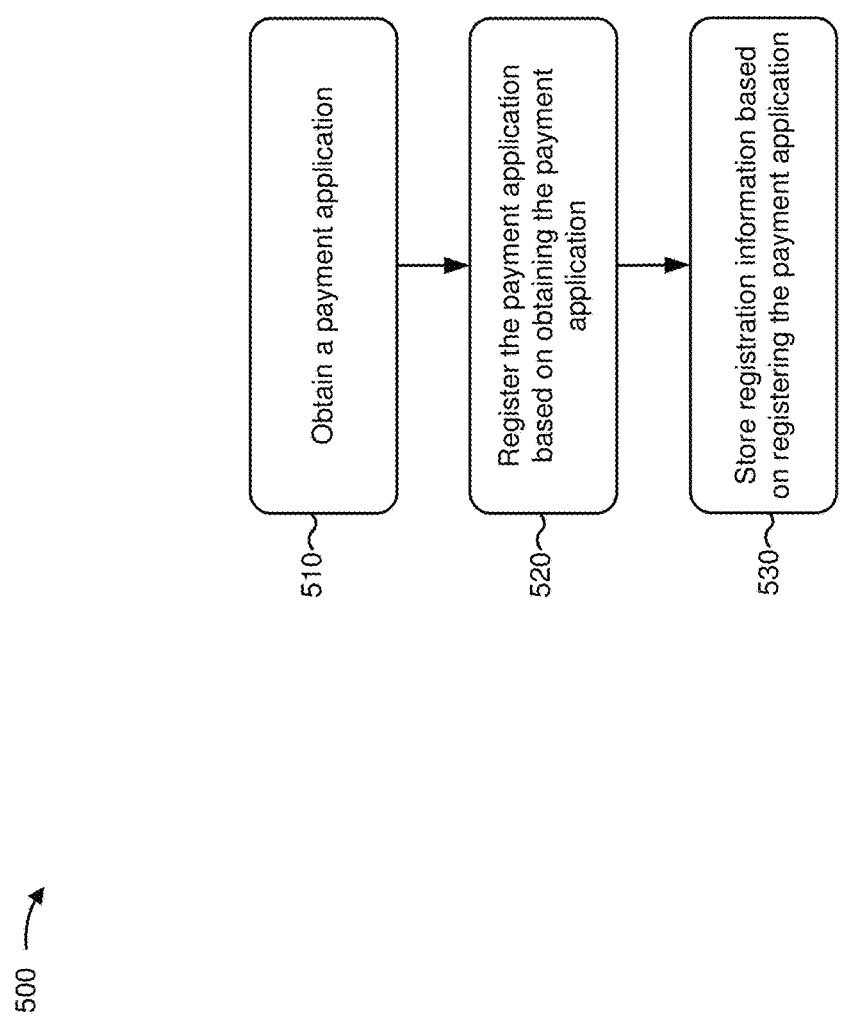
FIG. 5 is a flow chart of an example process for performing an initial registration of a user device for a contactless transaction.

FIG. 5 is a flow chart of an example process 500 for performing an initial registration of a user device for a contactless transaction. In some implementations, one or more process blocks of FIG. 5 may be performed by user device 210. In some implementations, one or more process blocks of FIG. 5 may be performed by another device or a group of devices separate from or including user device 210, such as point of sale device 220, application server 230, transaction server 240, or the like.

As shown in FIG. 5, process 500 may include obtaining a payment application (block 510). For example, user device 210 may obtain the payment application from application server 230. In some implementations, user device 210 may obtain the payment application based on a request. For example, user device 210 may transmit a request for the payment application to application server 230 to permit user device 210 to perform a set of contactless transactions with point of sale device 220. In this case, application server 230 may provide the payment application to user device 210 as a response to the request for the payment application. Additionally, or alternatively, user device 210 may include a data structure storing the payment application (e.g., the payment application may be installed with user device 210 by a vendor of user device 210). In this case, user device 210 may request that the payment application be registered based on a user interaction with a user interface of user device 210 (e.g., a user interaction indicating an intention to utilize the payment application).

As further shown in FIG. 5, process 500 may include registering the payment application based on obtaining the payment application (block 520). For example, user device 210 may register the payment application based on obtaining the payment application. In some implementations, user device 210 may transmit the request to register the payment application to application server 230. For example, user device 210 may request that application server 230 register the payment application for a particular account, such as a transit account, a rewards points account, a gift card account, or the like.

In some implementations, user device 210 may transmit information associated with identifying a user of user device 210 to register the payment application. For example, user device 210 may transmit a user name, a user password, a device identifier, an email address, a mobile number, or the like. In this case, application server 230 may be caused to verify accuracy of the user name, the user password, or the like to register the payment application for utilization. For example, application server 230 may utilize a multi-factor authentication procedure to verify the accuracy of the user name, the user password, or the like. In this way, user device 210 provides information that permits application server 230 to reduce a likelihood of account fraud relative to permitting a payment application to be utilized without requiring a verification to be performed. Additionally, or alternatively, user device 210 may transmit financial information associated with identifying a set of user accounts, such as a credit card account, a bank account, or the like, from which to draw/deposit funds for an account. For example, user device 210 may provide a credit card account, and may authorize application server 230 to automatically utilize the credit card account to add value to an account for contactless transactions.

In some implementations, user device 210 may cause application server 230 to generate a user identifier for user device 210 to register the payment application for utilization. For example, application server 230 may generate a unique user identifier for the user. Additionally, or alternatively, user device 210 may cause application server 230 to generate a key for user device 210. For example, application server 230 may generate a base salt key (e.g., a key for utilization in authenticating user device 210 for a secure connection to application server 230), and may store the base salt key and the unique user identifier. A base salt key may refer to an encryption key that may be utilized for encrypting a random number to perform a mutual authentication procedure, as described herein.

As further shown in FIG. 5, process 500 may include storing registration information based on registering the payment application (block 530). For example, user device 210 may store the registration information based on registering the payment application. In some implementations, user device 210 may store registration information received from application server 230. For example, user device 210 may receive information identifying a user identifier (e.g., a unique user identifier), a key (e.g., a base salt key), or the like, and may store the received information for utilization in establishing a secure session with application server 230. In this case, application server 230 may store corresponding information that may be utilized by application server 230 for establishing the secure session with user device 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
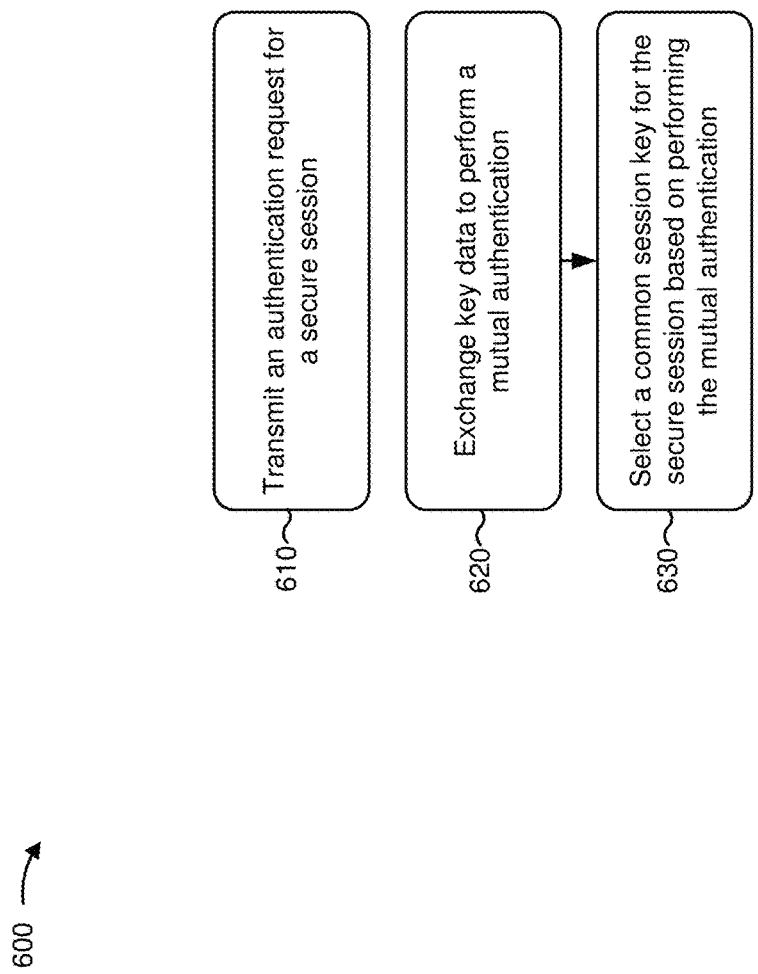
FIG. 6 is a flow chart of an example process for establishing a secure session.

FIG. 6 is a flow chart of an example process 600 for establishing a secure session. In some implementations, one or more process blocks of FIG. 6 may be performed by user device 210. In some implementations, one or more process blocks of FIG. 6 may be performed by another device or a group of devices separate from or including user device 210, such as point of sale device 220, application server 230, transaction server 240, or the like.

As shown in FIG. 6, process 600 may include transmitting an authentication request for a secure session (block 610). For example, user device 210 may transmit the authentication request for the secure session to application server 230. Additionally, or alternatively, user device 210 may transmit the authentication request for the secure session to point of sale device 220. In some implementations, user device 210 may transmit information associated with identifying user device 210 when transmitting the authentication request. For example, user device 210 may transmit a set of credentials, such as a user name, a password, a device identifier, a user identifier (e.g., a unique user identifier), or the like. In this way, user device 210 provides information to application server 230 to permit application server 230 to identify a salt key associated with user device 210.

In some implementations, user device 210 may transmit the authentication request to establish the secure session to obtain a dynamic card identifier, a dynamic diversified key, or the like. For example, after an initial registration to obtain a unique user identifier and a base salt key, user device 210 may utilize the unique user identifier and the base salt key to establish a secure session with application server 230 to receive the dynamic card identifier and the dynamic diversified key for performing a contactless transaction with point of sale device 220.

Additionally, or alternatively, user device 210 may transmit the authentication request to establish the secure session to obtain an updated dynamic card identifier, an updated dynamic diversified key, or the like. For example, after a threshold period of time, application server 230 may cause a first dynamic diversified key and a first dynamic card identifier to expire (e.g., to be rejected by point of sale device 220). In this case, user device 210 may establish the secure session to obtain a second dynamic diversified key and a second dynamic card identifier to replace the first dynamic diversified key and the first dynamic card identifier. In this way, user device 210 requests a secure session to permit user device 210 to be provisioned without connecting to point of sale device 220, thereby reducing a likelihood of fraud being performed, such as via a tampered point of sale device 220 relative to utilizing point of sale device 220 for provisioning. Moreover, user device 210 may reduce a quantity of point of sale devices 220 that are required for a particular location by reducing a demand for use of point of sale devices 220, thereby reducing a power consumption at the particular location.

Additionally, or alternatively, user device 210 may transmit the authentication request to establish the secure session to exchange card data with application server 230. For example, user device 210 may establish a secure session that permits application server 230 to update card data stored by user device 210 to alter an account value associated with the card data. In this way, user device 210 utilizes a secure session to permit user device 210 to update an account balance without requiring access to point of sale device 220, thereby improving a user experience. Additionally, or alternatively, user device 210 may transmit the authentication request to establish the secure session with point of sale device 220 to perform a contactless transaction with point of sale device 220. In this way, user device 210 utilizes a secure session to permit a contactless transaction without requiring Secure Element hardware or a contactless card.

As further shown in FIG. 6, process 600 may include exchanging key data to perform a mutual authentication (block 620). For example, user device 210 may exchange key data with application server 230 to perform the mutual authentication. Key data may refer to data associated with and/or generated based on a key, such as one or more random numbers encrypted based on a key. For example, application server 230 may obtain a base salt key corresponding to user device 210 based on receiving the authentication request and identifying a user identifier (e.g., a unique user identifier) and/or a password included in the authentication request. In this case, application server 230 may generate a first random number, may encrypt the first random number based on the base salt key corresponding to user device 210, and may transmit the encrypted first random number to user device 210. Further to the example, user device 210 may obtain a stored base salt key, and may decrypt the encrypted first random number based on stored base salt key. In this case, user device 210 may generate a second random number, and may encrypt the first random number and the second random number via the stored salt key. In some implementations, user device 210 may append the first random number to the second random number when encrypting the first random number and the second random number. Additionally, or alternatively, user device 210 may perform another operation on the first random number and the second random number.

Further to the example, user device 210 may transmit the encrypted first random number and second random number to application server 230. In this case, application server 230 may decrypt the encrypted first random number and second random number, determine that the first random number is the same first ransom number as was transmitted by application server 230, and may authenticate user device 210 based on determining that the first random number is the same first random number. In this way, application server 230 determines that user device 210 stores the same base salt key as application server 230, thereby authenticating user device 210.

Further to the example, application server 230 may encrypt the second random number based on the base salt key, and may transmit the encrypted second random number to user device 210. In this case, user device 210 may decrypt the encrypted second random number, and may determine that the second random number is the same second random number as was transmitted by user device 210. In this way, user device 210 determines that application server 230 stores the same base salt key as user device 210, thereby authenticating application server 230. In another example, user device 210 and point of sale device 220 may utilize a stored dynamic diversified key and a dynamic user identifier to perform a mutual authentication procedure for a contactless transaction.

As further shown in FIG. 6, process 600 may include selecting a common session key for the secure session based on performing the mutual authentication (block 630). For example, user device 210 may select the common session key (e.g., with application server 230) for the secure session based on performing the mutual authentication. In some implementations, user device 210 may utilize data exchanged during the mutual authentication as the common session key. For example, when user device 210 and application server 230 encrypt and transmit a first random number and a second random number to mutually authenticate, user device 210 and application server 230 may each utilize the first random number and the second random number as a session key for the secure session. In this way, user device 210 and application server 230 select a common session key for encrypting communications of a secure session based on a mutual authentication procedure and a common stored salt key, thereby reducing a likelihood of another user gaining access to the communications relative to a non-secure session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
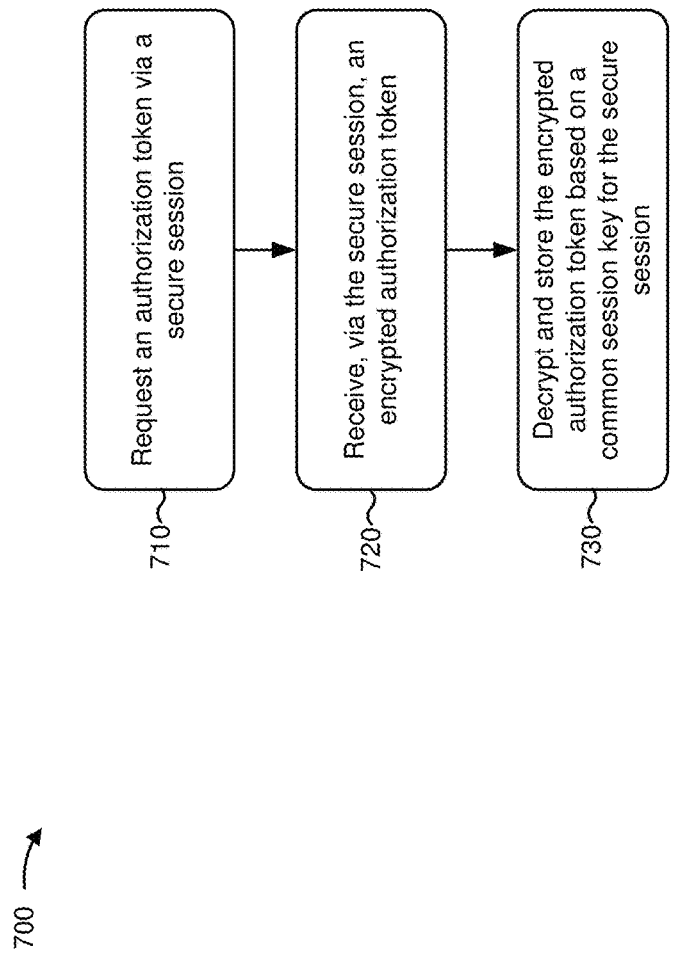
FIG. 7 is a flow chart of an example process for obtaining a dynamic card identifier and a dynamic diversified key.

FIG. 7 is a flow chart of an example process 700 for obtaining a dynamic card identifier and a dynamic diversified key. In some implementations, one or more process blocks of FIG. 7 may be performed by user device 210. In some implementations, one or more process blocks of FIG. 7 may be performed by another device or a group of devices separate from or including user device 210, such as point of sale device 220, application server 230, transaction server 240, or the like.

As shown in FIG. 7, process 700 may include requesting an authorization token via a secure session (block 710). For example, user device 210 may request the authorization token via the secure session established with application server 230. The authorization token may refer to a dynamic card identifier, a dynamic diversified key, or the like that user device 210 may utilize to exchange data with point of sale device 220 for a contactless transaction. In some implementations, the authorization token may refer to an updated authorization token. For example, after a first authorization token expires, user device 210 may request a second authorization token as an update. In some implementations, user device 210 may establish the secure session to request the authorization token. For example, user device 210 may perform a mutual authentication procedure with application server 230 to authenticate user device 210 and application server 230 and to select a session key for the secure session. In this case, user device 210 may utilize the session key to encrypt the request for the authorization token.

In some implementations, user device 210 may provide information associated with authenticating a user of user device 210. For example, user device 210 may provide a user interface with which to receive a user name and a user password, and may provide the user name and the user password to application server 230 to permit application server 230 to authenticate the user of user device 210. In this way, user device 210 reduces a likelihood of account fraud relative to permitting any user of user device 210 to request the authorization token.

As further shown in FIG. 7, process 700 may include receiving, via the secure session, an encrypted authorization token (block 720). For example, user device 210 may receive, via the secure session, the encrypted authorization token. In some implementations, user device 210 may cause application server 230 to generate and provide the encrypted authorization token. For example, based on requesting the authorization token, user device 210 may cause application server 230 to generate a dynamic card identifier and a dynamic diversified key as a response to the request. In this case, application server 230 may be caused to encrypt the dynamic card identifier and/or the dynamic diversified key using the common session key for the secure session, and provide the encrypted dynamic card identifier and the encrypted dynamic diversified key to user device 210 for decryption and utilization. In this way, application server 230 reduces a likelihood of account fraud relative to transmitting via an unsecure session.

In some implementations, the authorization token may be associated with a period identifier. The period identifier may indicate a period of time for which the dynamic card identifier and the dynamic diversified key are valid. For example, user device 210 may cause application server 230 to generate the authorization token during a particular period of time, identified by the period identifier, at the expiration of which the authorization token is to expire. Additionally, or alternatively, the authorization token may be associated with a threshold period of time. For example, user device 210 may cause application server 230 to activate a timer, and, after a threshold period of time is satisfied, the timer may cause application server 230 to expire the authorization token.

In some implementations, user device 210 may receive the encrypted authorization token for a particular account of user device 210. For example, when user device 210 requests the authorization token to permit a contactless transaction for a particular account (e.g., a transit account), application server 230 may generate the dynamic card identifier and the dynamic diversified key for the particular account. In this case, application server 230 may generate and provide another dynamic card identifier and another dynamic diversified key based on another request for another authorization token for another account. In this way, based on receiving multiple encrypted authorization tokens, user device 210 is permitted to emulate multiple contactless cards for multiple accounts.

As further shown in FIG. 7, process 700 may include decrypting and storing the authorization token based on a common session key for the secure session (block 740). For example, user device 210 may decrypt and store the authorization token based on the common session key for the secure session. In some implementations, user device 210 may store the authorization token via a data structure. For example, based on receiving the encrypted dynamic card identifier and the encrypted dynamic diversified key from application server 230 and performing decryption using a session key common to user device 210 and application server 230 for the secure session, user device 210 may store the dynamic card identifier and the dynamic diversified key for utilization in performing a contactless transaction. In this way, user device 210 obtains a dynamic card identifier and a dynamic diversified key for performing contactless transactions via a secure session.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
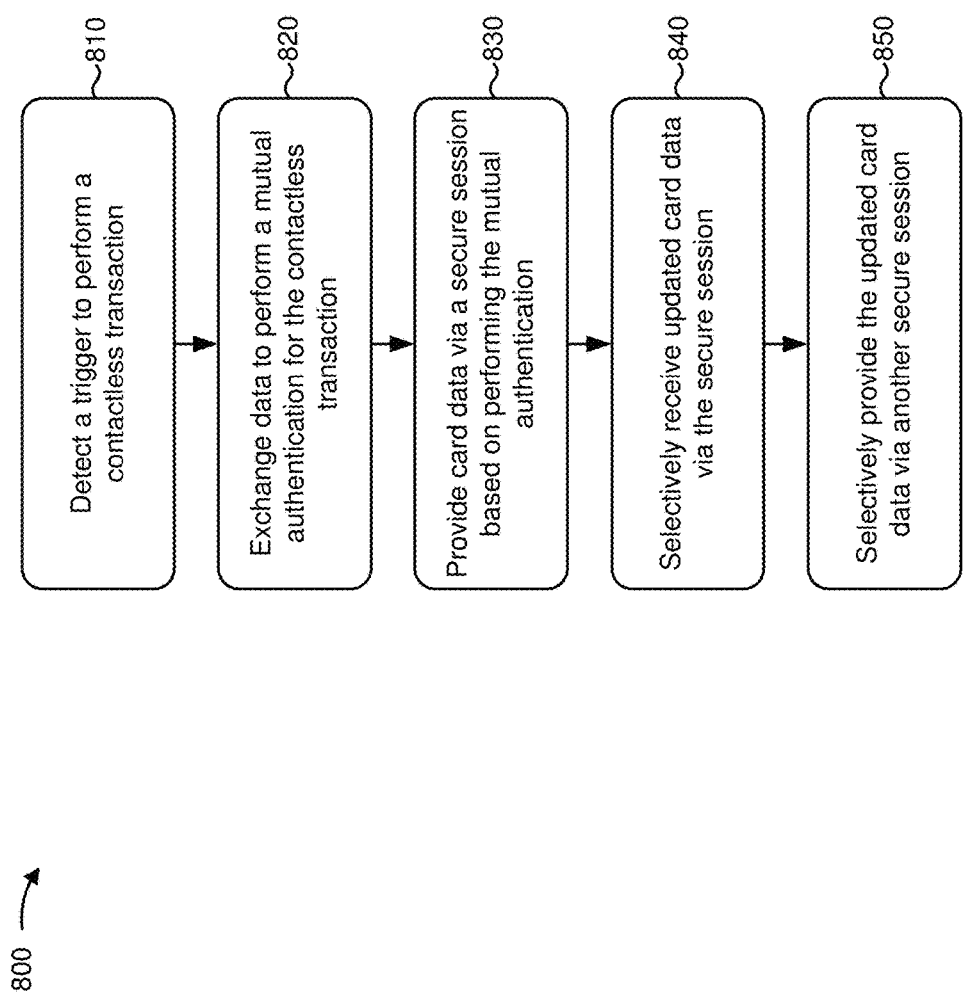
FIG. 8 is a flow chart of an example process for performing a contactless transaction.

FIG. 8 is a flow chart of an example process 800 for performing a contactless transaction. In some implementations, one or more process blocks of FIG. 8 may be performed user device 210. In some implementations, one or more process blocks of FIG. 8 may be performed by another device or a group of devices separate from or including user device 210, such as point of sale device 220, application server 230, transaction server 240, or the like.

As shown in FIG. 8, process 800 may include detecting a trigger to perform a contactless transaction (block 810). For example, user device 210 may detect the trigger to perform the contactless transaction. In some implementations, user device 210 may detect the trigger to perform the contactless transaction based on being within a threshold proximity of point of sale device 220. For example, when user device 210 is within the threshold proximity, point of sale device 220 may detect a beacon of user device 210 (e.g., a near field communication beacon), and may request a card identifier from user device 210 to perform a contactless transaction. Additionally, or alternatively, user device 210 may detect a beacon of point of sale device 220 (e.g., a near field communication beacon). In some implementations, user device 210 may be triggered to perform the contactless transaction based on detecting a user interaction via a user interface. For example, user device 210 may detect the user interaction indicating that the user desires user device 210 to perform the contactless transaction with point of sale device 220.

As further shown in FIG. 8, process 800 may include exchanging data to perform a mutual authentication for the contactless transaction (block 820). For example, user device 210 may exchange data with point of sale device 220 to perform the mutual authentication for the contactless transaction. In this case, user device 210 may provide a dynamic card identifier in response to a request for a (static) card identifier, and point of sale device 220 may be caused to generate a (dynamic) diversified key corresponding to a dynamic diversified key utilized by user device 210. Further to the example, user device 210 and point of sale device 220 may utilize the common dynamic diversified key to perform encryption and/or decryption associated with the mutual authentication and select a session key for a secure session.

In this way, based on providing a dynamic card identifier as a response to a request for a static card identifier, user device 210 integrates with legacy point of sale devices 220. Moreover, user device 210 reduces a likelihood of a security issue relative to performing the contactless transaction without authentication based on performing the mutual authentication prior to providing data associated with performing the contactless transaction. Furthermore, based on utilizing a dynamic card identifier and a dynamic diversified key, user device 210 reduces a harm caused by another device fraudulently obtaining the dynamic card identifier and/or the dynamic diversified key by reducing a quantity of time that the other device can perform fraudulent transactions relative to utilizing a static card identifier and/or a static diversified key that remains valid until a user manually cancels an account.

As further shown in FIG. 8, process 800 may include providing card data via a secure session based on performing the mutual authentication (block 830). For example, user device 210 may provide the card data to point of sale device 220 via the secure session based on performing the mutual authentication. In some implementations, user device 210 may determine that the mutual authentication is successful, and may provide the card data based on determining that the mutual authentication is successful. For example, when user device 210 and point of sale device 220 perform the mutual authentication and select a common session key for a secure session, user device 210 may be caused to transmit the card data via the secure session. Additionally, or alternatively, user device 210 may provide the card data based on receiving a request from point of sale device 220. For example, based on performing the mutual authentication successfully, point of sale device 220 may transmit a request for the card data to user device 210.

In some implementations, user device 210 may encrypt the card data for the secure session. For example, based on performing the mutual authentication and selecting a common session key, user device 210 may encrypt the card data using the common session key, and may transmit the encrypted card data to point of sale device 220 for decryption via the common session key. In this way, user device 210 reduces a likelihood that another device is able to obtain the transmitted card data and perform a fraudulent transaction relative to transmitting the card data without encryption. Furthermore, based on utilizing the dynamic diversified key to reduce a likelihood of account fraud, user device 210 obviates the need for Secure Element hardware to be available to perform encryption.

As further shown in FIG. 8, process 800 may include selectively receiving updated card data via the secure session (block 840). For example, user device 210 may selectively receive the updated card data from point of sale device 220 via the secure session. In some implementations, user device 210 may receive the updated card data indicating a change to an account value. For example, when point of sale device 220 debits or credits an account of user device 210 identified by the card data (e.g., decreases or increases a value of the account by the amount), point of sale device 220 may alter the card data to indicate the debit or credit to the account. In this case, point of sale device 220 may provide the updated card data to cause user device 210 to store card data corresponding to an updated value of the account.

In some implementations, user device 210 may receive the updated card data based on point of sale device 220 successfully validating the contactless transaction. For example, point of sale device 220 may confirm that the dynamic card identifier and the dynamic diversified key remain valid based on information received from application server 230 (e.g., via transaction server 240). In this case, point of sale device 220 may perform a query to determine that the dynamic card identifier and the dynamic diversified key remain valid. For example, point of sale device 220 may transmit information identifying the dynamic card identifier to transaction server 240, may receive response information indicating that the dynamic card identifier is valid, and may permit the contactless transaction and provide the updated card data associated with the contactless transaction.

In some implementations, user device 210 may fail to receive updated card data. For example, when the user is performing a balance check (e.g., a user intends to utilize point of sale device 220 to view a balance of an account rather than perform a contactless transaction) or when point of sale device 220 fails to validate the contactless transaction, user device 210 may fail to receive the updated card data. In this case, user device 210 may continue to utilize the card data for one or more subsequent contactless transactions. In this way, user device 210 reduces an amount of processing resources utilized by avoiding receiving updated card data for storage when the card data has not been altered.

As further shown in FIG. 8, process 800 may include selectively providing the updated card data via another secure session (block 850). For example, user device 210 may selectively provide the updated card data to application server 230 via the other secure session. In some implementations, user device 210 may provide the updated card data based on receiving the updated card data. For example, when user device 210 determines that application server 230 is available for the other secure session, user device 210 may transmit the updated card data. Additionally, or alternatively, when user device 210 determines that application server 230 is not available for the other secure session, user device 210 may store the update data, and may subsequently transmit the updated card data when application server 230 becomes available.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9B:
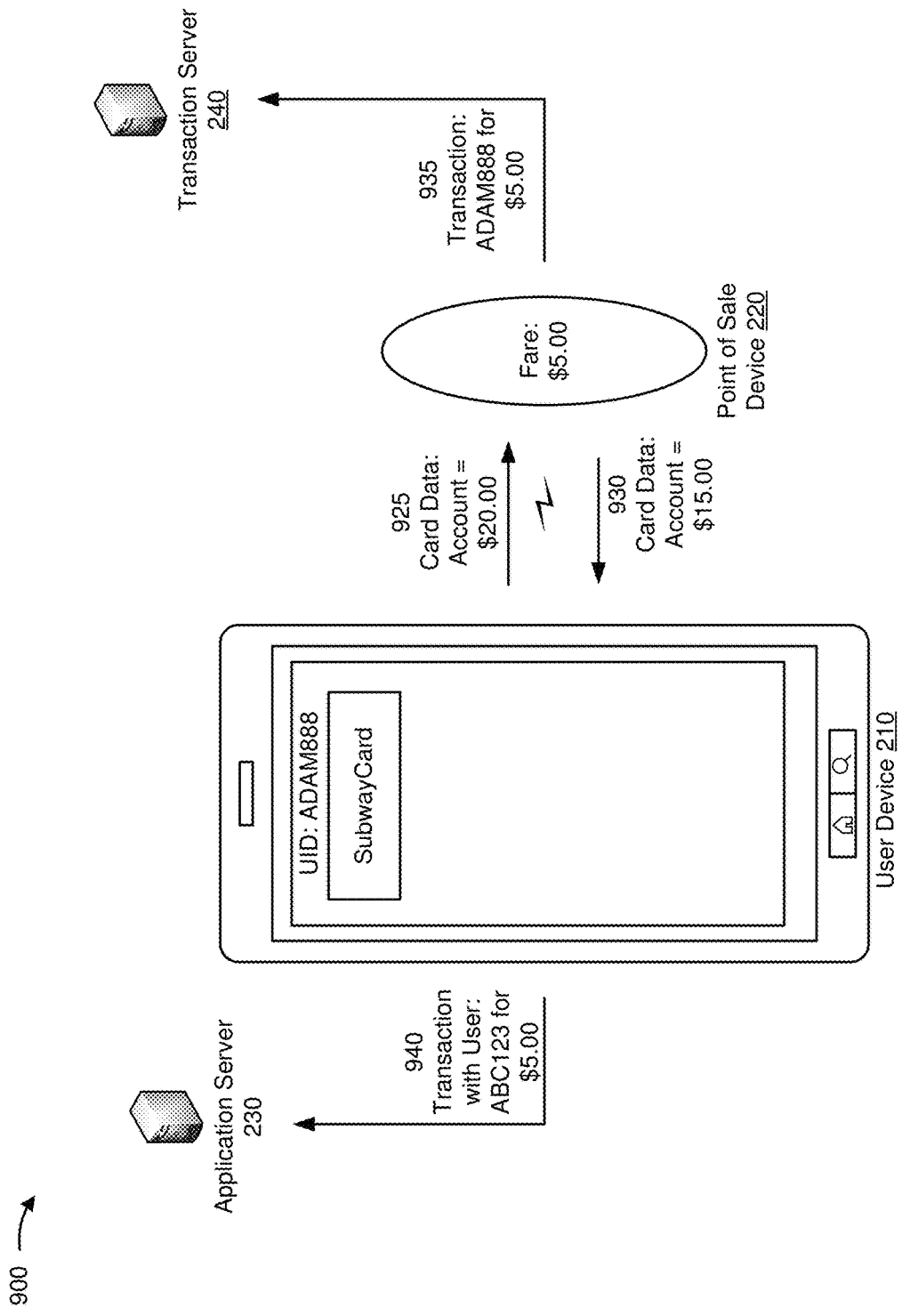
Figure 9C:
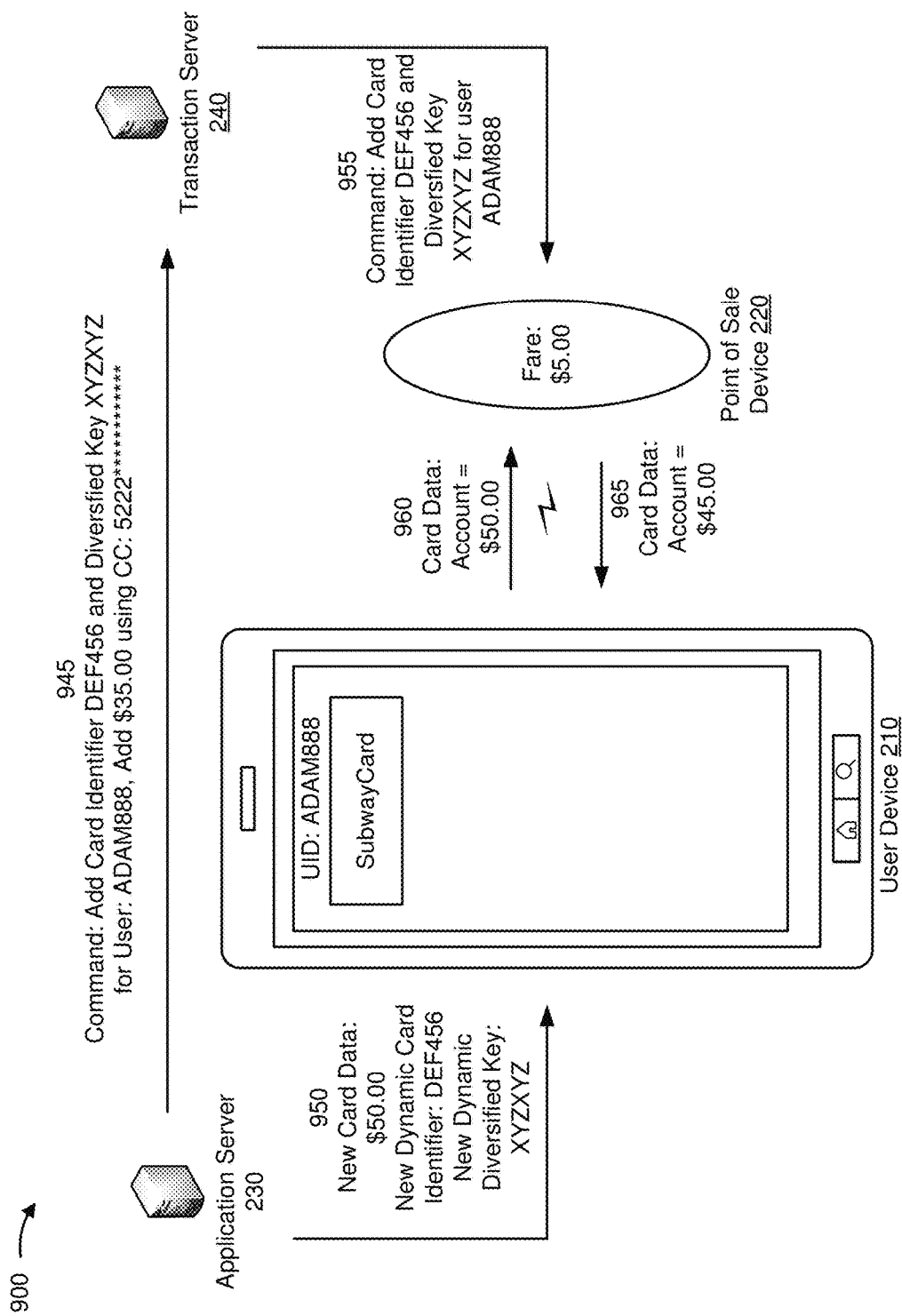

FIGS. 9A-9C are diagrams of an example implementation 900 relating to example processes 500, 600, 700, and 800 shown in FIGS. 5, 6, 7, and 8, respectively. FIGS. 9A-9C show an example of performing a contactless transaction.

As shown in FIG. 9A, and by reference number 910, when user device 210 is within a particular proximity of point of sale device 220, user device 210 may perform a mutual authentication with point of sale device 220 to permit a first contactless transaction with a particular account (e.g., a "SubwayCard" account for a transit fare). As shown by reference number 915, user device 210 may provide a dynamic card identifier to point of sale device 220. As shown by reference number 920, point of sale device 220 may perform the mutual authentication with user device 210 using a dynamic diversified key corresponding to the dynamic card identifier. Assume that the mutual authentication is successful.

As shown in FIG. 9B, and by reference number 925, user device 210 may provide first card data to point of sale device 220 indicating a first value for the particular account (e.g., "$20.00"). Based on the transit fare for the first contactless transaction, point of sale device 220 may be caused to determine a second value for the particular account (e.g., "$15.00). As shown by reference number 930, user device 210 receives, from point of sale device 220, second card data indicating the second value for storage via user device 210. As shown by reference number 935, point of sale device 220 provides a transaction record to transaction server 240. As shown by reference number 940, user device 210 provides a transaction record to application server 230. Assume that the transaction record indicates, to application server 230, that the value of the account (e.g., the second value, "$15.00") fails to satisfy a value threshold, and triggers application server 230 to add value to the account.

As shown in FIG. 9C, and by reference number 945, application server 230 exchanges data with transaction server 240 to cause transaction server 240 to utilize an updated dynamic card identifier for user device 210, an updated dynamic diversified key for user device 210, and to add value to the particular account using a particular credit card. As shown by reference number 950, application server 230 provides, to user device 210, third card data (e.g., identifying a third value for the particular account, "$50.00," based on adding the value to the particular account), the updated dynamic card identifier, and the updated dynamic diversified key. In some implementations, user device 210 may provide, for display via a user interface, an indication of the third value for the particular account. As shown by reference number 955, transaction server 240 provides information identifying the updated dynamic card identifier and the updated dynamic diversified key for user device 210. Assume that user device 210 and point of sale device 220 perform a mutual authentication for a second contactless transaction using the updated dynamic card identifier and the updated dynamic diversified key. As shown by reference number 960, user device 210 provides the third card data indicating the third value for the particular account. As shown by reference number 965, user device 210 receives, from point of sale device 220, fourth card data indicating a fourth value for the particular account based on the second contactless transaction.

As indicated above, FIGS. 9A-9C are provided merely as an example. Other examples are possible and may differ from what was described with regard to FIGS. 9A-9C.

In this way, user device 210 utilizes a dynamic card identifier and a dynamic diversified key to emulate a contactless card with improved security relative to a contactless card that utilizes a static card identifier and a static diversified key.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, or a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   establish a first secure connection with a server, without connecting to a point of sale device, based on an expiration of a time period and using a unique user identifier and a base salt key;
   receive a dynamic card identifier, a dynamic diversified key, and a period identifier from the server based on establishing the first secure connection,
      the dynamic card identifier and the dynamic diversified key being valid for a threshold period of time and being invalid after the threshold period of time,
      the threshold period of time being indicated by the period identifier received with the dynamic card identifier and the dynamic diversified key;
   detect a trigger to perform a contactless transaction,
   the trigger relating to the device being within a threshold proximity of the point of sale device; provide the dynamic card identifier associated with the device based on detecting the trigger to perform the contactless transaction;
   exchange data, with the point of sale device after providing the dynamic card identifier, to perform a mutual authentication to establish a secure session,
      the data being encrypted based on the dynamic diversified key associated with the dynamic card identifier;
   and
   perform the contactless transaction via the secure session based on exchanging the data to perform the mutual authentication to establish the secure session.

2. The device of claim 1, where the one or more processors are further to:
   receive, after performing the contactless transaction and after the threshold period of time has elapsed, an updated dynamic card identifier and an updated dynamic diversified key; and
   use the updated dynamic card identifier and the updated dynamic diversified key to perform another contactless transaction.

3. The device of claim 1, where the one or more processors, when performing the contactless transaction, are to:
   provide first card data identifying a first value of an account;
   receive second card data identifying a second value of the account based on the point of sale device performing the contactless transaction,
      the second value being different from the first value; and
   store the second card data.

4. The device of claim 3, where the one or more processors are further to:
   provide the second card data, after storing the second card data, for another contactless transaction with another point of sale device;
   receive, from the other point of sale device, third card data identifying a third value of the account based on the other point of sale device performing the other contactless transaction; and
   store the third card data.

5. The device of claim 1, where the one or more processors are further to:
   provide a transaction record indicating a first value of an account associated with the contactless transaction,
      the first value of the account failing to satisfy a value threshold;
   receive card data identifying a second value of the account based on providing the transaction record indicating the first value of the account; and
   utilize the card data identifying the second value of the account for another contactless transaction.

6. The device of claim 1, where the one or more processors are further to:
   provide, for display via a user interface, an indication of a value of an account associated with the contactless transaction.

7. The device of claim 1, where the one or more processors, when exchanging the data with the point of sale device, are to:
   receive encrypted information from the point of sale device,
      the encrypted information being encrypted based on a copy of the dynamic diversified key,
      the copy of the dynamic diversified key being stored by the point of sale device; and
   decrypt the encrypted information based on the dynamic diversified key.

8. A non-transitory computer-readable medium storing instructions, the instructions comprising:
   one or more instructions that, when executed by one or more processors, cause the one or more processors to:
   establish a first secure connection with a server, without connecting to a point of sale device, based on an expiration of a time period and using a unique user identifier and a base salt key;
receive a first authorization token,
the first authorization token including a first dynamic card identifier, a first dynamic diversified key, and a period identifier,
the first dynamic card identifier and the first dynamic diversified key being valid for a first period and being invalid after the first period, and
the first period being indicated by the period identifier;
perform a first mutual authentication using the first authorization token during the first period;
perform a first contactless transaction based on performing the first mutual authentication using the first authorization token during the first period;
receive, after the first period is complete, a second authorization token,
the second authorization token including a second dynamic card identifier and a second dynamic diversified key,
the second authorization token being associated with a second period;
perform a second mutual authentication using the second authorization token during the second period; and
perform a second contactless transaction based on performing the second mutual authentication using the second authorization token during the second period.

9. The non-transitory computer-readable medium of claim 8, where
the first dynamic card identifier is different from the second dynamic card identifier,
the first dynamic diversified key is different from the second dynamic diversified key.

10. The non-transitory computer-readable medium of claim 8, where the one or more instructions, that cause the one or more processors to perform the first contactless transaction, cause the one or more processors to:
perform the first contactless transaction via a near field communication based connection.

11. The non-transitory computer-readable medium of claim 8, where the one or more instructions, when executed by the one or more processors, further cause the one or more processors to:
receive a third authorization token during the first period,
the third authorization token including a third dynamic card identifier and a third dynamic diversified key;
perform a third mutual authentication using the third authorization token during the first period; and
perform a third contactless transaction based on performing the third mutual authentication using the third authorization token during the first period,
the first contactless transaction being associated with a first account,
the third contactless transaction being associated with a second account, and
the first account being different from the second account.

12. The non-transitory computer-readable medium of claim 8, where the one or more instructions, when executed by the one or more processors, further cause the one or more processors to:
store the first authorization token via a data structure,
the data structure not being associated with Secure Element hardware.

13. The non-transitory computer-readable medium of claim 8, where the one or more instructions, that cause the one or more processors to receive the first authorization token, cause the one or more processors to:
receive the first authorization token via a secure session.

14. The non-transitory computer-readable medium of claim 8, where the one or more instructions, that cause the one or more processors to perform the first mutual authentication, cause the one or more processors to:
determine a session key for a secure session based on performing the first mutual authentication; and
where the one or more instructions, that cause the one or more processors to perform the first contactless transaction, cause the one or more processors to:
encrypt transmitted data of the first contactless transaction using the session key.

15. A method, comprising:
establishing, by a device, a first secure connection with a server, without connecting to a point of sale device, based on an expiration of a time period and using a unique user identifier and a base salt key;
receiving, by the device, a dynamic card identifier, a dynamic diversified key, and a period identifier from the server based on establishing the first secure connection,
the dynamic card identifier and the dynamic diversified key being valid for a threshold period of time and being invalid after the threshold period of time,
the threshold period of time being indicated by the period identifier received with the dynamic card identifier and the dynamic diversified key;
detecting, by the device, a trigger to perform a contactless transaction;
transmitting, by the device, the dynamic card identifier based on detecting the trigger to perform the contactless transaction;
receiving, by the device, first encrypted data after transmitting the dynamic card identifier;
decrypting, by the device, the first encrypted data to generate first data based on the dynamic diversified key associated with the dynamic card identifier;
encrypting, by the device, the first data and second data to generate second encrypted data based on the dynamic diversified key;
transmitting, by the device, the second encrypted data;
receiving, by the device, third encrypted data;
decrypting, by the device, the third encrypted data to identify the second data based on the dynamic diversified key;
transmitting, by the device, card data associated with an account based on decrypting the third encrypted data to identify the second data; and
receiving, by the device, updated card data associated with the account after transmitting the card data.

16. The method of claim 15, further comprising:
using the first data and the second data as a session key;
encrypting the card data based on the session key; and
where transmitting the card data comprises:
transmitting the card data based on encrypting the card data.

17. The method of claim 16, where receiving the updated card data comprises:
receiving encrypted updated card data;
decrypting the encrypted updated card data to identify the updated card data based on the session key; and
storing the updated card data.

18. The method of claim 15, further comprising:
receiving an updated dynamic card identifier and an updated dynamic diversified key associated with the updated dynamic card identifier;
transmitting the updated dynamic card identifier;
receiving fourth encrypted data after transmitting the updated dynamic card identifier;
decrypting the fourth encrypted data to generate fourth data based on the updated dynamic diversified key;
encrypting the fourth data and fifth data to generate fifth encrypted data based on the updated dynamic diversified key;
receiving sixth encrypted data;
decrypting the sixth encrypted data to identify the fifth data based on the updated dynamic diversified key;
transmitting the updated card data associated with the account based on decrypting the sixth encrypted data to identify the fifth data; and
receiving other updated card data associated with the account after transmitting the updated card data.

19. The method of claim 18, further comprising:
using the fourth data and the fifth data as a session key;
encrypting the updated card data based on the session key; and
where transmitting the updated card data comprises:
 transmitting the updated card data based on encrypting the updated card data.

20. The method of claim 18, where receiving the updated dynamic card identifier and the updated dynamic diversified key associated with the updated dynamic card identifier comprises:
determining that the threshold period of time has elapsed;
exchanging data with a server device to establish a secure session based on determining that the threshold period of time has elapsed; and
receiving the updated dynamic card identifier and the updated dynamic diversified key via the secure session.

* * * * *